(12) United States Patent
Furukawa et al.

(10) Patent No.: US 8,721,849 B2
(45) Date of Patent: May 13, 2014

(54) ELECTRODE HOLDER

(75) Inventors: Hideo Furukawa, Matsuyama (JP); Tomohisa Takeda, Imabari (JP)

(73) Assignee: Miura Co., Ltd., Matsuyama-Shi (JP)

( * ) Notice: Subject to any disclaimer, the term of this patent is extended or adjusted under 35 U.S.C. 154(b) by 1816 days.

(21) Appl. No.: 11/883,634

(22) PCT Filed: Dec. 27, 2005

(86) PCT No.: PCT/JP2005/024223
§ 371 (c)(1),
(2), (4) Date: Aug. 3, 2007

(87) PCT Pub. No.: WO2006/092905
PCT Pub. Date: Sep. 8, 2006

(65) Prior Publication Data
US 2008/0116060 A1 May 22, 2008

(30) Foreign Application Priority Data

Mar. 2, 2005 (JP) .................................. 2005-57088

(51) Int. Cl.
*G01F 23/00* (2006.01)
(52) U.S. Cl.
CPC ...................................... *G01F 23/00* (2013.01)
USPC .................. 204/228.2; 204/228.1; 73/304 R; 73/304 C; 73/866.5; 219/119
(58) Field of Classification Search
CPC ....... B23K 9/24; G01F 23/00; G01F 23/0007; G01F 23/0015; G01F 23/003; G01F 23/0038; G01F 23/0046; G01F 23/0061; G01F 23/0069; G01F 23/24; G01F 23/242; G01F 23/241; G01F 23/28
USPC .......... 73/304 C, 304 R; 204/228.2; 219/138; 340/620
See application file for complete search history.

(56) References Cited

U.S. PATENT DOCUMENTS 3,158,682 A * 11/1964 Goellner ....................... 174/151
(Continued)

FOREIGN PATENT DOCUMENTS

| GB | 1 599 695 | 10/1981 |
| JP | 63-247622 A | 10/1988 |
| JP | 1-59828 U | 4/1989 |
| JP | 6-80357 A | 11/1994 |

(Continued)

*Primary Examiner* — Brian Jennison
(74) *Attorney, Agent, or Firm* — Fox Rothschild LLP

(57) ABSTRACT

A substantially ring-shaped seat section (8) protrudes from an inner circumference wall in a through hole (4) of a container attaching section (6) made of a metal. On an outer circumference of an electrode shaft (3) held in the through hole (4) through an insulator (5) made of a synthetic resin, locking protrusions (13, 14), which have a diameter larger than a hole diameter of the seat section (8), are provided at a distance from the seat section (8), on at least inner side or outer side of the seat section (8) in a shaft direction of the electrode shaft (3). Thus, for instance, when the inside of the metal container (2) is at a high temperature, the insulator (5) is destroyed and the electrode shaft (3) is to jump out from the container attaching section (6) to the outside or the inside of the metal container (2), the locking protrusions (13, 14) lock the seat section (8) and prevent the electrode shaft (3) from jumping out. Furthermore, since a space provided between the electrode shaft (3) and the container attaching section (6) due to the destruction of the insulator (5) is covered by having the locking protrusions (13, 14) lock the seat section (8), leakage of a liquid in the metal container (2) can be suppressed to minimum even the insulator (5) is destroyed.

7 Claims, 2 Drawing Sheets

(56) References Cited

U.S. PATENT DOCUMENTS

| | | |
|---|---|---|
| 4,137,558 A | 1/1979 | Beaman |
| 4,507,521 A | 3/1985 | Goellner |
| 5,249,431 A | 10/1993 | Kuribara et al. |
| 5,669,263 A * | 9/1997 | Borchers et al. ............ 73/304 R |
| 5,992,251 A | 11/1999 | Grieger et al. |
| 7,081,597 B2 * | 7/2006 | Severance, Jr. ............ 219/121.5 |

FOREIGN PATENT DOCUMENTS

| | | |
|---|---|---|
| JP | 10-2778 A | 1/1998 |
| JP | 2000-46628 A | 2/2000 |
| JP | 2000-46629 A | 2/2000 |
| JP | 2001-272265 A | 10/2001 |
| JP | 2004-212342 A | 7/2004 |
| JP | 2004-219317 A | 8/2004 |

* cited by examiner

ELECTRODE HOLDER

TECHNICAL FIELD

The present invention relates to an electrode holder for mounting an electrode for detecting a liquid level, an electric conductivity, or the like of a liquid stored in a metal container, to the metal container in an insulation state.

BACKGROUND ART

Up to now, for example, as liquid level detecting means for finding a liquid level in a boiler body, a feed water tank, or the like, or as electric conductivity detecting means for finding an electric conductivity of a boiler water or the like, an electrode holder is mounted in an insulation state to a metal container for detection communicating with inside the boiler body or inside the feed water tank, and one power supply is connected to an electrode of the electrode holder while the other power supply is connected to the metal container to supply power application, for detecting a state of a liquid, such as a liquid level, an electric conductivity, or the like, based on a state of conduction between an electrode of the electrode holder and the metal container.

As the electrode holder to be mounted to the metal container, there is known one including an electrode shaft having one end as a terminal portion and another end as a detection electrode portion, and a container mounting portion having a through-hole and made of metal, for holding the electrode shaft in the through-hole through an intermediation of an insulator formed of a synthetic resin, and having a structure in which the electrode shaft is mounted to the metal container by the container mounting portion in a state where the electrode shaft passes through a hole portion of the metal container while being electrically insulated from the metal container by the insulator (see JP-A 2000-46628).

According to the electrode holder, for example, when an inside is in a high-temperature state like in a case of the boiler body, an inside of the metal container communicating therewith is also in the high-temperature state. Therefore, there is a fear that the insulator of the electrode holder mounted to the metal container and exposed to the inside of the metal container cannot resist the high temperature, to thereby be destroyed.

When the insulator is destroyed as described above, there is a fear of the electrode shaft held by the container mounting portion coming out of the container mounting portion to fall off into the metal container. In particular, when a negative pressure exists in the metal container, there is a fear that the electrode shaft falls off to be drawn into the metal container, thereby damaging the metal container. Further, when a high pressure exists inside like in the case of the boiler body, a high pressure also exists in the metal container, so there is a fear that due to the destruction of the insulator, the electrode shaft held by the container mounting portion comes out of the container mounting portion to burst out of the metal container, and a liquid in the metal container is issued from a gap generated between the electrode shaft and the container mounting portion.

Further, the electrode shaft and the container mounting portion are each formed of metal while the insulator is formed of a synthetic resin, so the electrode shaft and the insulator, and the container mounting portion and the insulator easily slide with each other, respectively. Due to a difference in coefficient of linear expansion between the electrode shaft or the container mounting portion formed of metal and the insulator formed of a synthetic resin, and a mold shrinkage factor of the synthetic resin, or when a torsional torque is applied to the electrode shaft or the container mounting portion, there is a fear that abrasion is caused between the electrode shaft and the insulator or between the container mounting portion and the insulator, thereby causing a liquid in the metal container to leak from a gap generated by the abrasion.

DISCLOSURE OF INVENTION

It is an object of the present invention to provide an electrode holder with which it is possible to prevent an electrode shaft from being burst out of or into a metal container even when an insulator is destroyed and to suppress as much as possible leakage of a liquid in the metal container from a gap generated between the electrode shaft and a container mounting portion due to destruction of the insulator.

It is another object of the present invention to provide an electrode holder with which it is possible to prevent occurrence of abrasion between the electrode shaft and the insulator or between the container mounting portion and the insulator, and to prevent leakage of a liquid in the metal container.

It is still another object of the present invention to provide an electrode holder having an insulator whose heat resistance and water repellency are increased, to thereby enhance durability and insulation properties of the insulator.

The above-mentioned objects of the present invention are achieved by an electrode holder, including: an electrode shaft having one end as a terminal portion and another end as a detection electrode portion; and a container mounting portion having a through-hole and formed of metal, for holding the electrode shaft in the through-hole through an intermediation of an insulator formed of a synthetic resin, the electrode shaft passing through a hole portion of a metal container and being mounted to the metal container by the container mounting portion in a state where the electrode shaft is electrically insulated from the metal container by the insulator, characterized in that: the container mounting portion is provided with, in the through-hole thereof, a seat portion having a substantially ring shape and protruding from an inner peripheral wall of the container mounting portion formed by the through-hole; and the electrode shaft is provided with, on an outer periphery thereof, an engagement protruding portion on at least one of an inner side and an outer side in an axial direction of the electrode shaft with respect to the seat portion, the engagement protruding portion being spaced apart from the seat portion and having a larger diameter than a hole diameter of the seat portion.

With this construction, when, for example, the inside of the metal container is in a high-temperature state, the insulator of the electrode holder, which is exposed to the inside of the metal container cannot resist the high temperature, to thereby be destroyed, and the electrode shaft is about to burst out of or into the metal container from the container mounting portion, the engagement protruding portion engages with the seat portion, thereby making it possible to prevent the electrode shaft from bursting out of or into the metal container. Further, a gap generated between the electrode shaft and the container mounting portion due to the destruction of the insulator is closed by engagement between the seat portion and the engagement protruding portion. Thus, it is possible to suppress the leakage of a liquid in the metal container as much as possible even when the insulator is destroyed.

The engagement protruding portion is provided on both the inner side and the outer side in the axial direction of the electrode shaft with respect to the seat portion.

With this construction, even when the insulator exposed to the inside of the metal container of the electrode holder is destroyed, and the electrode shaft is about to burst out of or into the metal container from the container mounting portion, the engagement protruding portion engages with the seat portion, thereby making it possible to prevent the electrode shaft from bursting out of or into the metal container.

A rotation stop portion is provided on a contact surface between the electrode shaft and the insulator, and a rotation stop portion is provided on a contact surface between the container mounting portion and the insulator.

With this construction, when a torsional torque is applied between the electrode shaft and the insulator or between the insulator and the container mounting portion, the respective rotation portions prevent slippage between the electrode shaft and the insulator and between the container mounting portion and the insulator to avoid abrasions between the electrode shaft and the insulator and between the container mounting portion and the insulator, respectively. Thus, it is possible to prevent leakage of a liquid in the metal container.

Inside the through-hole of the container mounting portion and in the outer periphery of the electrode shaft, a protrusion is provided, which has a receiving surface abutting on the moving insulator orthogonally or at an acute angle with respect to a moving direction of the insulator, for receiving movement of the insulator expanding or contracting in the axial direction of the electrode shaft.

With this construction, the insulator moving in the axial direction by expanding to be larger than the electrode shaft or the container mounting portion formed of metal or by contracting is received by the receiving surface of the protrusion. The receiving surface of the protrusion constitutes a surface abutting on the moving insulator orthogonally or at an acute angle with respect to the moving direction of the insulator, so the moving insulator and the receiving surface come into close contact with each other. Thus, sealability between the insulator and the receiving surface increases, so even when abrasion is caused between the electrode shaft and the insulator or between the container mounting portion and the insulator, due to sealing between the insulator and the receiving surface, the leakage of a liquid in the metal container can be prevented.

The insulator includes an inner insulating layer covering the electrode shaft while coming into contact therewith and an outer insulating layer covering a portion of an outer periphery of the inner insulating layer, which is exposed to inside the metal container when mounted to the metal container; the inner insulating layer is formed of engineering plastic having heat resistance, high-pressure resistance, and chemical resistance; and the outer insulating layer is formed of a resin excellent in water repellency.

With this construction, the engineering plastic constituting the inner insulating layer can resist high temperature even if inside the metal container is in high-temperature state because the engineering plastic has high heat resistance, high-pressure resistance, and chemical resistance. However the engineering plastic undergoes textural change (change in glass fiber temperature) at about 150° C. to lose water repellency, so the insulation property thereof is deteriorated. On the other hand, a resin excellent in water repellency and constituting the outer insulating layer covering the outer periphery of the engineering plastic, for example, the fluorine-based resin keeps the same water repellency even at high temperature, so it is possible to maintain the insulation property of the insulator. That is, the inner insulating layer is formed of the engineering plastic, thereby preventing the insulator from being destroyed due to high temperature, and the outer insulating layer is formed of the resin excellent in water repellency, thereby maintaining the water repellency of the insulator.

The engineering plastic is polyether ether ketone, and the resin excellent in water repellency is an ethylene fluoride-fluoroalkoxyethylene copolymer.

With this construction, due to the heat resistance of polyether ether ketone, the destruction of the insulator due to high temperature is prevented, and by the water repellency of an ethylene fluoride-fluoroalkoxyethylene copolymer, the insulation property of the insulator is maintained.

The outer insulating layer engages with an engagement groove formed in an end portion of the container mounting portion so that the outer insulating layer do not move in the axial direction of the electrode shaft and engages with an engagement groove formed in a detection electrode portion of the electrode shaft so that the outer insulating layer do not move in the axial direction of the electrode shaft.

With this construction, the movement of the outer insulating layer in the axial direction due to contraction is prevented, thereby no gap is generated between the outer insulating layer and the end portion of the container mounting portion and between the outer insulating layer and the detection electrode portion. Thus, the insulation property of the insulator is maintained.

BEST MODE FOR CARRYING OUT THE INVENTION

In order to describe the present invention in more detail, a description thereof will be made with reference to the accompanying drawings.

Figure 1:
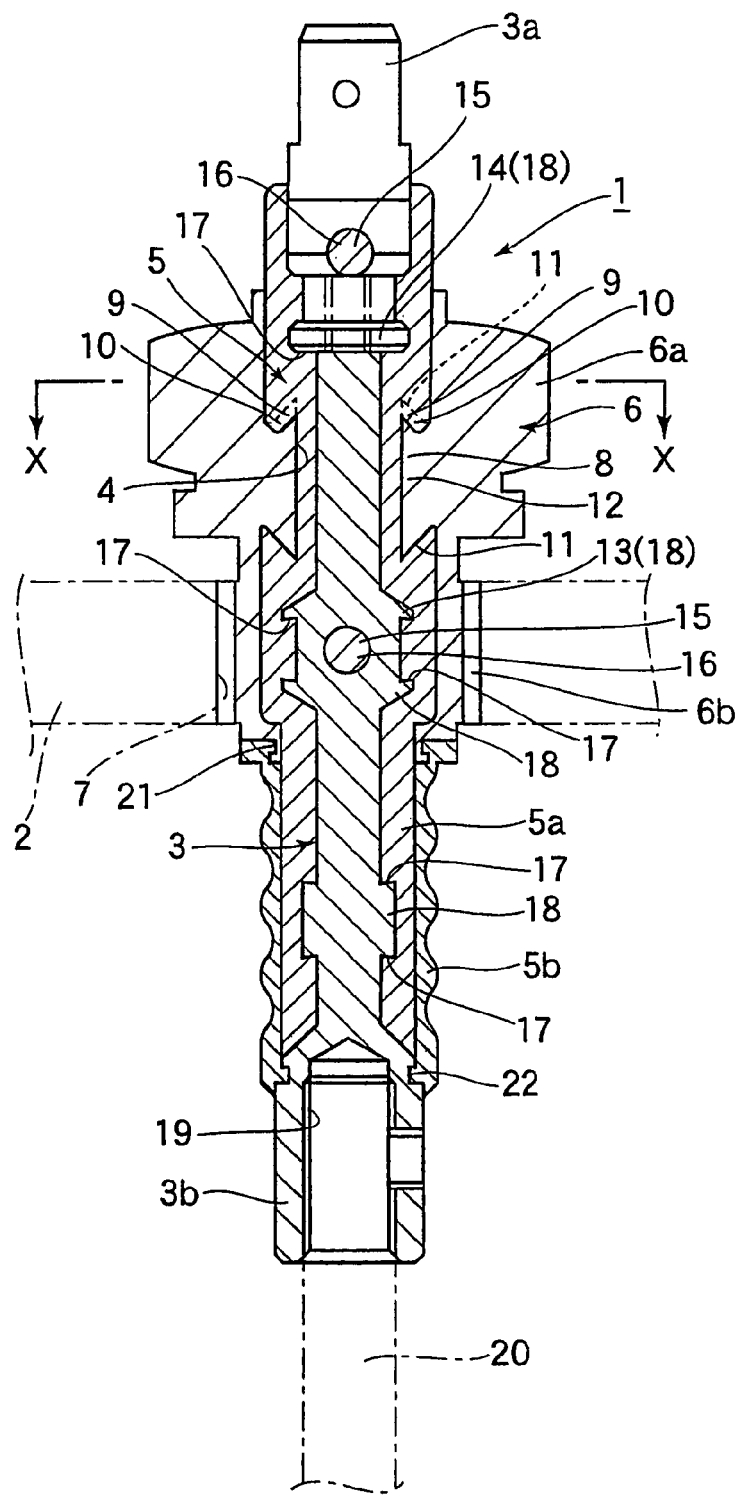
FIG. 1 is a longitudinal sectional view showing an example of a shape of an electrode holder according to the present invention.
Figure 2:
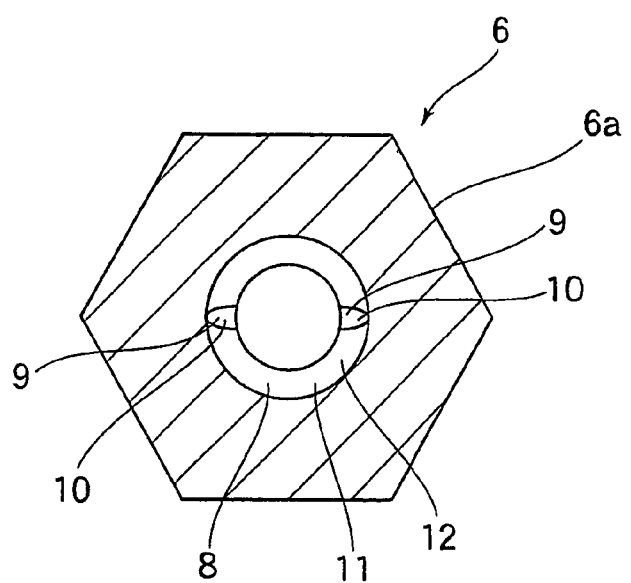
FIG. 2 is a sectional view taken along the line X-X of FIG. 1, a part of which being omitted.

FIGS. 1 and 2 each show an example of a shape of an electrode holder according to the present invention. FIG. 1 is a longitudinal sectional view of the electrode holder according to this example. FIG. 2 is a sectional view taken along the line X-X of FIG. 1, a part of which being omitted.

An electrode holder 1 of this example is mounted to a metal container 2 to detect a liquid level, an electric conductivity, or the like of a liquid in the metal container 2 based on a state of conduction between an electrode (described later) and the metal container 2. The metal container 2 is mounted so as to communicate with a boiler body, a feed water tank, or the like, and is used for detecting a liquid level, an electric conductivity, or the like of a liquid in the boiler body or the feed water tank.

The electrode holder 1 includes an electrode shaft 3 having one end as a terminal portion 3a and the other end as a detection electrode portion 3b, and a container mounting portion 6 having a through-hole 4 and made of metal, for holding the electrode shaft 3 in the through-hole 4 through an intermediation of an insulator 5 formed of a synthetic resin. The electrode holder 1 is mounted to the metal container 2 through the container mounting portion 6 in a state where the electrode shaft 3 passes through a hole portion 7 of the metal container 2 while being electrically insulated from the metal container 2 by the insulator.

The container mounting portion 6 is provided with a hexagonal head portion 6a having a larger diameter formed on an upper portion of the container mounting portion 6, and a male thread portion 6b formed on an outer periphery of a lower portion thereof to be threadingly engaged with a female thread portion formed in the hole portion 7.

The through-hole 4 is formed in an axis of the container mounting portion 6. In the through-hole 4, there is provided a seat portion 8 having a substantial ring shape, protruding from an inner peripheral wall of the container mounting portion 6, the inner peripheral wall being formed by the through-hole 4.

Further, on the inner peripheral wall of the container mounting portion 6 formed by the through-hole 4, that is, a contact surface of the container mounting portion 6 with respect to the insulator 5, there are provided rotation stop portions 10 for preventing rotation caused by slippage between the container mounting portion 6 and the insulator 5 when a torsional torque is applied between the container mounting portion 6 and the insulator 5. A shape of each of the rotation stop portions 10 is not particularly limited as long as the rotation stop portions 10 prevent the slippage between the container mounting portion 6 and the insulator 5 or increases contact resistance between the container mounting portion 6 and the insulator 5. In this example, on a seat surface of the seat portion 8 protruding into the through-hole 4, grooves 9 are formed in a direction that intersects the axis of the through-hole 4, the grooves 9 serving as the rotation stop portions 10. When the insulator 5 enters in the grooves 9, the container mounting portion 6 and the insulator 5 are integrated with each other, thereby preventing the slippage between the container mounting portion 6 and the insulator 5.

Further, on the inner peripheral wall of the container mounting portion 6 formed by the through-hole 4, that is, the contact surface of the container mounting portion 6 with respect to the insulator 5, there is provided a protrusion 12 having receiving surfaces 11 abutting on the insulator 5 orthogonally or at an acute angle with respect to a moving direction of the moving insulator 5, for receiving the movement of the moving insulator 5 in the axial direction of the through-hole 4 by expanding to be larger than the container mounting portion 6 or by contracting. In this example, the seat portion 8 also serves as the protrusion 12 and the seat surface of the seat portion 8 constitutes the receiving surfaces 11. Each of the receiving surfaces 11 is inclined to abut on the moving insulator 5 at an acute angle.

Further, the electrode shaft 3 has a predetermined length and is formed of metal having corrosion resistance and heat resistance. One end of the electrode shaft 3 constitutes the terminal portion 3a and the other end thereof constitutes the detection electrode portion 3b. A portion of the electrode shaft 3 is covered with the insulator 5 except the terminal portion 3a and the detection electrode portion 3b so as to be insulated from the container mounting portion 6.

On an outer periphery of the electrode shaft 3, engagement protruding portions 13 and 14 having larger diameter than a hole diameter of the seat portion 8 are respectively formed while being spaced apart from each other on an inner side (detection electrode portion 3b side) and an outer side (terminal portion 3a side) in the axial direction with respect to the seat portion 8.

In this example, as described above, on the outer periphery of the electrode shaft 3, the engagement protruding portions 13 and 14 are respectively formed on the inner side (detection electrode portion 3b side) and the outer side (terminal portion 3a side) in the axial direction with respect to the seat portion 8. However, this is not obligatory. When a high pressure exists in the metal container 2 to which the electrode holder 1 of this example is mounted, it suffices that, on the outer periphery of the electrode shaft 3, the engagement protruding portion 13 is provided on the inner side (detection electrode portion 3b side) in the axial direction with respect to the seat portion 8. On the other hand, when a negative pressure exists in the metal container 2, it suffices that, on the outer periphery of the electrode shaft 3, the engagement protruding portion 14 is provided on the outer side (terminal portion 3a side) in the axial direction with respect to the seat portion 8.

Further, on the outer periphery of the electrode shaft 3, that is, the contact surface thereof with respect to the insulator 5, there is provided rotation stop portions 15 for preventing rotation caused by the slippage between the electrode shaft 3 and the insulator 5 when a torsional torque is applied between the electrode shaft 3 and the insulator 5.

A shape of each of the rotation stop portions 15 is not particularly limited as long as the rotation stop portion 15 prevents the slippage between the electrode shaft 3 and the insulator 5 or increases the contact resistance between the electrode shaft 3 and the insulator 5. In this example, the electrode shaft 3 are provided with through-holes 16 passing through the electrode shaft 3 in a direction intersecting with the axial direction thereof. The through-holes 16 serve as the rotation stop portions 15. When the insulator 5 enters in the through-hole 16, the electrode shaft 3 and the insulator 5 are integrated with each other, thereby preventing the slippage between the electrode shaft 3 and the insulator 5.

Further, on the outer periphery of the electrode shaft 3, that is, the contact surface thereof with respect to the insulator 5, there are provided protrusions 18 having receiving surfaces 17 abutting on the moving insulator 5 orthogonally or at an acute angle with respect to the moving direction of the insulator 5. In this example, the engagement protruding portions 13 and 14 each also serve as the protrusion 18, and each of surfaces of the engagement protruding portions 13 and 14 orthogonal to the axis of the electrode shaft 3 constitutes the receiving surface 17. In this example, each of the receiving surfaces 17 abuts on the moving insulator 5 so as to be orthogonal to the moving direction of the insulator 5.

Further, in this example, the detection electrode portion 3b of the electrode shaft 3 is provided with a threaded hole 19 which opens toward an end and is threadingly connected to a detection electrode 20. However, the detection electrode portion 3b may constitute the detection electrode 20.

The insulator 5 according to this example is composed of an inner insulating layer 5a covering the electrode shaft 3 while coming into contact therewith, and an outer insulating layer 5b covering an outer periphery of a part of the inner insulating layer 5a, which is exposed to inside the metal container 2 when the electrode holder 1 is mounted to the metal container 2.

The inner insulating layer 5a is formed of engineering plastic having heat resistance, high-pressure resistance, and chemical resistance. A preferable example of the engineering plastic includes polyether ether ketone. Polyether ether ketone is excellent in heat resistance, high-pressure resistance, and chemical resistance, as well as moldability. Further, the outer insulating layer 5b is formed of a resin excellent in water repellency, for example, a fluorine-based resin. A preferable example of the fluorine-based resin includes an ethylene fluoride-fluoroalkoxyethylene copolymer.

Further, in this example, the outer insulating layer 5b engages with an engagement groove 21, which is formed in an end of the container mounting portion 6, so as not to move in the axial direction of the electrode shaft 3, and engages with an engagement groove 22, which is formed in the detection electrode portion 3b, so as not to move in the axial direction of the electrode shaft 3.

In the electrode holder 1 structured as described above, the seat portion 8 is provided inwardly of the through-hole 4 of the container mounting portion 6, and on the outer periphery of the electrode shaft 3, the engagement protruding portions 13 and 14 each having a diameter larger than the hole diameter of the seat portion 8 are respectively provided while being spaced apart from each other on the inner side and the outer side in the axial direction of the electrode shaft 3 with respect to these at portion 8. Therefore, when, for example, the inside of the metal container 2 to which the electrode holder 1 is mounted is in a high-temperature state, the insulator 5 of the electrode holder 1, which is exposed to the inside of the metal container 2 cannot resist the high temperature, to thereby be destroyed, and the electrode shaft 3 is about to burst out of or into the metal container 2 from the container mounting portion 6, the engagement protruding portion 13 or the engagement protruding portion 14 engages with the seat portion 8, thereby making it possible to prevent the electrode shaft 3 from bursting out of or into the metal container 2.

Further, a gap generated between the electrode shaft 3 and the container mounting portion 6 due to the destruction of the insulator 5 is closed by engagement between the seat portion 8 and the engagement protruding portion 13 or the engagement protruding portion 14. Thus, it is possible to suppress the leakage of a liquid in the metal container 2 as much as possible even when the insulator 5 is destroyed.

Further, on the inner peripheral wall of the container mounting portion 6 formed by the through-hole 4, that is, the contact surface of the container mounting portion 6 with respect to the insulator 5, there are provided the rotation stop portions 10, while on the outer periphery of the electrode shaft 3, that is, the contact surface thereof with respect to the insulator 5, there are provided the rotation stop portions 15. Accordingly, when the torsional torque is applied between the electrode shaft 3 and the insulator 5 and between the container mounting portion 6 and the insulator 5, the rotation stop portions 10 and 15 stop the slippage between the electrode shaft 3 and the insulator 5 and between the container mounting portion 6 and the insulator 5, to thereby prevent the abrasion between the electrode shaft 3 and the insulator 5 and between the container mounting portion 6 and the insulator 5. Thus, it is possible to prevent the leakage of a liquid in the metal container 2.

Further, on the inner peripheral wall of the container mounting portion 6 formed by the through-hole 4, that is, the contact surface of the container mounting portion 6 with respect to the insulator 5, there is provided the protrusion 12 having the receiving surfaces 11 abutting on the moving insulator 5 orthogonally or at an acute angle with respect to the moving direction of the insulator 5, for receiving the movement of the insulator 5 moving in the axial direction by expanding to be larger than the container mounting portion 6 or by contracting. Further, on the outer periphery of the electrode shaft 3, that is, the contact surface thereof with respect to the insulator 5, there are provided the protrusions 18 having the receiving surfaces 17 abutting on the moving insulator 5 orthogonally or at an acute angle with respect to the moving direction of the insulator 5, for receiving the movement of the insulator 5 moving in the axial direction by expanding to be larger than the electrode shaft 3 or by contracting. Accordingly, the insulator 5 moved by the expansion or contraction and each of the receiving surfaces 11 and 17 come into close contact with each other, thereby enhancing a sealing property therebetween. Thus, even when the abrasion is caused between the electrode shaft 3 and the insulator 5 or between the container mounting portion 6 and the insulator 5, the sealing between the insulator 5 and each of the receiving surfaces 11 and 17 enables to prevent the leakage of a liquid in the metal container 2.

Further, the insulator 5 includes the inner insulating layer 5a covering the electrode shaft 3 while coming into contact therewith, and the outer insulating layer 5b covering a part of the outer periphery of the inner insulating layer 5a, which is exposed to the inside of the metal container 2 when the electrode holder 1 is mounted to the metal container 2. The inner insulating layer 5a is formed of engineering plastic having heat resistance, high-pressure resistance, and chemical resistance. The outer insulating layer 5b is formed of a fluorine-based resin. The engineering plastic constituting the inner insulating layer 5a is excellent in heat resistance, high-pressure resistance, and chemical resistance, and can resist high temperature even when the inside of the metal container 2 is in the high-temperature state. However, the engineering plastic undergoes textural change (change in glass fiber temperature) at about 150° C. to lose water repellency, so the insulation property thereof is deteriorated. On the other hand, the fluorine-based resin constituting the outer insulating layer 5b covering the outer periphery of the engineering plastic keeps the same water repellency even at high temperature, so it is possible to maintain the insulation property of the insulator 5. That is, the inner insulating layer 5a is formed of the engineering plastic, thereby preventing the insulator 5 from being destroyed due to high temperature, and the outer insulating layer 5b is formed of the fluorine-based resin, thereby maintaining the water repellency of the insulator 5.

Further, since the outer insulating layer 5b engages with the engagement groove 21, which is formed in the end portion of the container mounting portion 6, so as not to move in the axial direction of the electrode shaft 3, and engages with the engagement groove 22, which is formed in the detection electrode portion 3b of the electrode shaft 3, so as not to move in the axial direction of the electrode shaft 3, the movement in the axial direction due to the expansion or contraction of the insulating layer 5b is prevented. Thus, no gap is generated between the outer insulating layer 5b and the end portion of the container mounting portion 6 and between the outer insulating layer 5b and the detection electrode portion 3b, so the insulation property of the insulator 5 is maintained.

The invention claimed is:

1. An electrode holder, comprising:
an electrode shaft having a first end as a terminal portion and a second end as a detection electrode portion;
a container mounting portion formed of metal provided with a hexagonal head portion formed on an upper portion of the container mounting portion and a male thread portion formed on an outer periphery of a lower portion thereof, wherein a through-hole is formed along an axis of the hexagonal head portion and the male thread portion, and the electrode shaft is held coaxially in an interior portion of the through-hole; and
an insulator formed of a synthetic resin configured to integrate the electrode shaft with the container mounting portion by mediating between an outer periphery of the electrode shaft and an inner periphery of the through-hole formed along an axis of the hexagonal head portion and the male thread portion,
the electrode shaft passing through a hole portion of a metal container and being mounted to the metal container by the container mounting portion in a state where the electrode shaft is electrically insulated from the metal container by the insulator, characterized in that:
the container mounting portion is provided with, in the through-hole formed along an axis of the hexagonal head portion and the male thread portion, a seat portion having a substantially ring shape and protruding in an orthogonal direction of the electrode shaft from the inner peripheral wall of the through-hole;

the electrode shaft is provided with, on a surface thereof, an engagement protruding portion being spaced apart from the seat portion to the detection electrode portion side and having a larger diameter than a hole diameter of the seat portion, wherein the engagement protruding portion engages with the seat portion when the electrode shaft tries to burst out of the metal container from the container mounting portion; and the engagement protruding portion provided on the electrode shaft surface is positioned to be spaced apart from the seat portion by the insulator.

2. The electrode holder according to claim 1, characterized in that:
a rotation stop portion is provided on a contact surface between the electrode shaft and the insulator; and
a rotation stop portion is provided on a contact surface between the container mounting portion and the insulator.

3. The electrode holder according to claim 1, characterized in that inside the through-hole of the container mounting portion and in the outer periphery of the electrode shaft, a protrusion is provided, which has a receiving surface abutting on the moving insulator orthogonally or at an acute angle with respect to a moving direction of the insulator, for receiving movement of the insulator expanding or contracting in the axial direction of the electrode shaft.

4. The electrode holder according to claim 1, characterized in that:
the insulator comprises an inner insulating layer covering the electrode shaft while coming into contact therewith and an outer insulating layer covering a portion of an outer periphery of the inner insulating layer, which is exposed to inside the metal container when mounted to the metal container;
the inner insulating layer is formed of engineering plastic having heat resistance, high-pressure resistance, and chemical resistance; and
the outer insulating layer is formed of a resin excellent in water repellency.

5. The electrode holder according to claim 4, characterized in that: the engineering plastic is polyether ether ketone; and the resin excellent in water repellency is an ethylene fluoride-fluoroalkoxyethylene copolymer.

6. The electrode holder according to claim 4 or 5, characterized in that the outer insulating layer engages with an engagement groove formed in an end portion of the container mounting portion so that the outer insulating layer do not move in the axial direction of the electrode shaft and engages with an engagement groove formed in a detection electrode portion of the electrode shaft so that the outer insulating layer do not move in the axial direction of the electrode shaft.

7. An electrode holder, comprising:
an electrode shaft having a first end as a terminal portion and a second end as a detection electrode portion;
a container mounting portion formed of metal provided with a hexagonal head portion formed on an upper portion of the container mounting portion and a male thread portion formed on an outer periphery of a lower portion thereof, wherein a through-hole is formed along an axis of the hexagonal head portion and the male thread portion, and the electrode shaft is held coaxially in an interior portion of the through-hole; and
an insulator formed of a synthetic resin configured to integrate the electrode shaft with the container mounting portion by mediating between an outer periphery of the electrode shaft and an inner periphery of the through-hole formed along an axis of the hexagonal head portion and the male thread portion,
the electrode shaft passing through a hole portion of a metal container and being mounted to the metal container by the container mounting portion in a state where the electrode shaft is electrically insulated from the metal container by the insulator, characterized in that:
the container mounting portion is provided with, in the through-hole formed along an axis of the hexagonal head portion and the male thread portion, a seat portion having a substantially ring shape and protruding in an orthogonal direction of the electrode shaft from the inner peripheral wall of the through-hole;
the electrode shaft is provided with, on a surface thereof, an engagement protruding portion being spaced apart from the seat portion to the terminal portion side and having a larger diameter than a hole diameter of the seat portion, wherein the engagement protruding portion engages with the seat portion when the electrode shaft tries to burst into the metal container from the container mounting portion; and
the engagement protruding portion provided on the electrode shaft surface is positioned to be spaced apart from the seat portion by the insulator.

* * * * *